J. BLACK.
Dressing Millstones.

No. 3,699.

Patented Aug. 10, 1844.

UNITED STATES PATENT OFFICE.

JOHN BLACK, OF HELENA, ARKANSAS.

DRESSING MILLSTONES.

Specification of Letters Patent No. 3,699, dated August 10, 1844.

*To all whom it may concern:*

Be it known that I, JOHN BLACK, of Helena, in the county of Phillips and State of Arkansas, have made a new and useful Improvement in the Manner of Laying Off and Dressing the Faces of Millstones; and I do hereby declare that the following is a full and exact description thereof.

Figure 1:
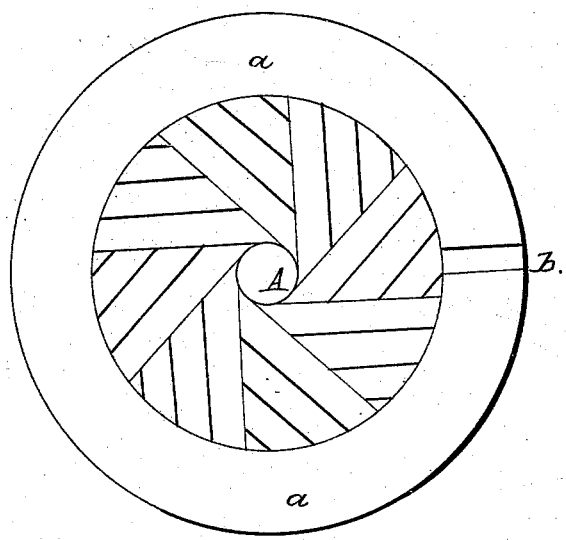
Figure 2:
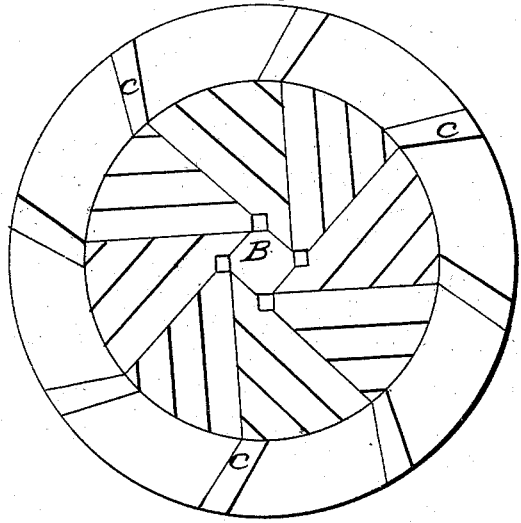

In the accompanying drawing Figure 1, represents the face of the bed-stone, and Fig. 2, the face of the runner. In describing them I will suppose them to be twenty four inches in diameter; but this diameter is assumed for the purpose of description only. In stones of any other diameter the same relative proportions as those here given are to be preserved, with such departure only therefrom as will still leave them substantially the same in their construction and operation.

The upper surface of the bedstone A, is cut into furrows and lands, in eight different directions, as shown in the drawing; and they extend nine inches from the center toward the circumference, leaving a space $a$, $a$, toward the rim of the stone of three inches in width. This part is to be left perfectly smooth and flat, and is to be dressed down one fourth of an inch below the furrows and lands. The face of the runner B, Fig. 2, is to be cut into furrows and lands in like manner, and to the same distance with the bedstone. On the outside of these lands and furrows, on that part of the stone that corresponds with the plane part of the bed-stone, I form lands $c$, $c$, $c$, usually eight in number extending to the circumference of the stone; these eight lands stand in a direction the reverse of those toward the center, as represented in the drawing. In the bedstone there is a notch $b$, made, at the place of the spout, which conducts the meal or flour, into the trough. The eight reversed lands $c$, $c$, $c$, serve to scrape, or draw the meal or flour to the notch, or opening $b$, through which it escapes. By this mode of dressing the stones their friction is much diminished, and they may be made to run with greater velocity than when the lands on both stones extend to the circumference, while the quantity of grain which is ground need not be diminished.

Having thus fully described my improvement in the manner of forming the lands and furrows in the dressing of the faces of mill stones, what I claim therein as new and desire to secure by Letters Patent, is—

The dressing of the outer edge of the bedstone flat and smooth to an extent, and in the manner set forth, and the dressing of that part of the runner that corresponds thereto, with lands, usually eight in number, and having their direction the reverse of those on the other part of the face, as described and represented, and for the purpose set forth.

JOHN BLACK.

Witnesses:
W. H. RINGO,
W. E. PRESTON.